Dec. 8, 1959  C. H. GARMAGER  2,916,123
CLUTCH ELEMENT WITH CERAMIC-METALLIC FRICTION DISC
Filed June 18, 1956
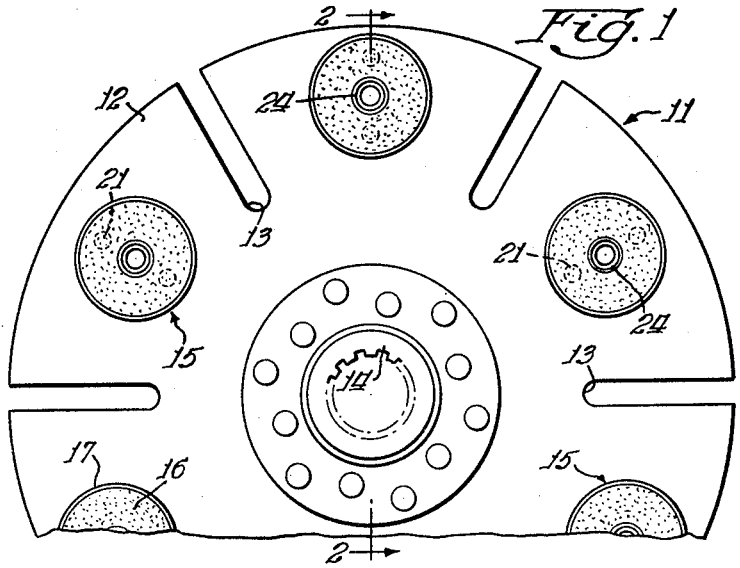
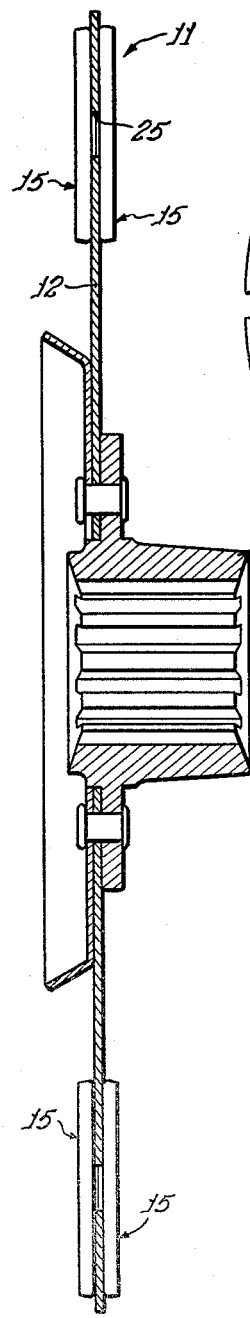
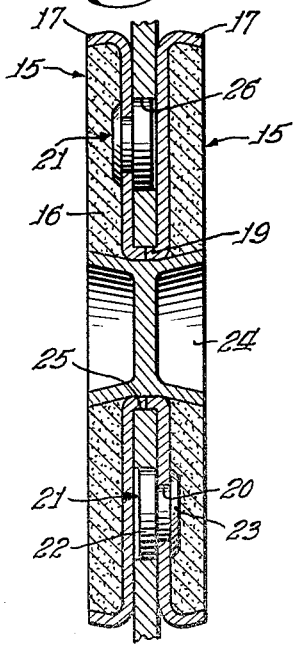
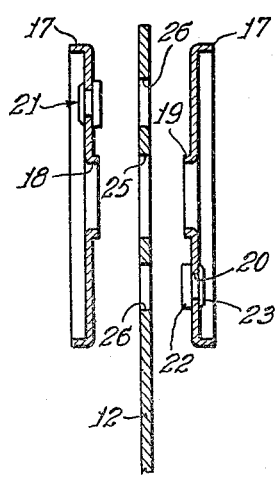
Inventor:
Curt H. Garmager
By:
Richard E. Burr  Atty.

United States Patent Office 2,916,123
Patented Dec. 8, 1959

2,916,123

CLUTCH ELEMENT WITH CERAMIC-METALLIC FRICTION DISC

Curt H. Garmager, Rockford, Ill., assignor to Borg-Warner Corporation, Chicago, Ill., a corporation of Illinois Application June 18, 1956, Serial No. 591,983

2 Claims. (Cl. 192—107)

This invention relates to clutches and more particularly to friction elements therefor. In the past dry clutches have usually been provided with a friction facing of organic material. In recent years because of very heavy loads imposed on certain types of clutches such as in tractors, clutches have been provided with friction facing elements containing ceramics and metals. In one form the friction element is an annular disc of ceramic-metallic friction material which is supported in a shallow metal cup. It is essential that this friction element be secured to the supporting member so that it will not be dislodged nor will it rotate even under very severe conditions.

Broadly, this invention relates to a clutch driven disc having a plurality of ceramic-metallic friction discs secured to its face and particularly to means for securing the friction discs to the driven disc.

A primary object of the present invention is to provide a means for securing friction discs to the supporting element in such a manner that the discs can not be dislodged nor will they rotate.

A further object of the present invention is to provide a means for securing ceramic-metallic friction discs to a plate so that they may be easily attached and detached when it is necessary to renew the friction material.

Still another object is to provide a clutch driven disc which is adapted for very severe service and which is simple and economical to fabricate.

Other objects and advantages of the present invention will become apparent during the course of the following description, reference being had therein to the accompanying drawings, in which:

Fig. 1 is an elevational view of a clutch driven disc with the friction elements retained thereon in the manner contemplated by my invention;

Fig. 2 is a view partially in cross-section taken on the line 2—2 of Fig. 1;

Fig. 3 is an enlarged cross-sectional view taken through the center of one of the friction elements; and Fig. 4 is an exploded view partially in cross-section showing the friction elements detached from the supporting plate.

The invention is illustrated as applied to a driven disc of a clutch but it is also useful for application of friction elements to the flywheel or pressure plate of a clutch. Figures 1 and 2 show a clutch driven disc 11 which is adapted to cooperate with a flywheel and a pressure plate to provide an operating clutch assembly. The driven disc includes annular plate 12 provided with slots 13 which help to prevent dishing of the plate when it is heated. A splined hub 14 is riveted to the center of the plate 12 for attachment to a shaft.

At spaced intervals near the periphery of the plate 12 a plurality of friction elements 15 are positioned. In the embodiment shown three of these friction elements are positioned close to the periphery of the plate and three alternating elements are positioned nearer the center of the plate.

As is shown in Figures 3 and 4, each friction element comprises two separable assemblies one of which is positioned on each side of the plate 12. Each assembly comprises an annulus of friction material 6 which is preferably made up of ceramic and metallic ingredients. The friction material is held tightly in a shallow metal cup 17 which extends from the front face of the material entirely around the periphery thereof and covers the entire back portion of said friction material. The cup 17 is crimped over the friction material as shown. The cup 17 is provided with a central aperture 18 around which the metal is formed in a horizontally extending flange 19. At some distance from the central opening a second aperture 20 is provided in the back of the cup 17. In this aperture is positioned a rivet 21 having a large head 22 which projects to the rear of the cup 17. The end of the rivet opposite the head is upset as shown at 23. The upset portion 23 is hammered comparatively flat so that it is a substantial distance below the engaging surface of the friction material 16. A duplicate friction element 15 is positioned on opposite sides of the plate 12 with its rivet 21 spaced from the rivet 21 of the opposite friction element. A large rivet 24 passing through both friction elements 15 and through an opening 25 in the plate secures the two elements on the plate. The rivet heads 22 are positioned in the openings 26 in the plate 11 which are spaced on either side of the larger opening 25.

When in use the type of clutch shown is subjected to a high degree of heat and a large amount of friction because of the heavy duty for which it is designed. If the friction elements 15 should turn on the center rivet 21 they would soon shear off said rivet and the friction element would be loosened from the plate 12. This may create considerable damage since the friction elements are usually about 2¼ inch in diameter and are sharp and hard. I have found that my method of attachment using a central rivet 24 and the side rivets 21 provides a structure which securely holds the friction elements to the driven plate under the most severe conditions.

When it is necessary to renew the lining of the driven disc it is a simple matter to knock out the center rivet 26 allowing the friction element 17 to be pried off the disc. New friction elements are then easily attached by placing one on either side of the disc and expanding the center rivet.

While this invention is particularly useful in connection with the driven disc of a clutch, it may also be used in connection with the flywheel or pressure plate elements of a clutch. With these elements the friction discs are secured to only one side of the plate with the central rivet holding the disc directly to the plate.

Although a particular embodiment of my invention has been described, it will be understood by those skilled in the art that other constructions may be used without departing from the principles of my invention. The above description is merely an embodiment and the scope of my invention should be limited only by the following claims.

I claim:

1. A clutch driven disc comprising an annular plate defining a plurality of spaced apertures therein; a plurality of friction elements positioned on the front and back surfaces of said plate; each friction element including an annular disc of friction material defining a central aperture therein; an annular metal cup embracing said disc on its back and around its periphery; a rivet positioned in an opening in the back of said cup with one end upset and positioned below the rubbing surface of said friction material and having a head on its opposite end projecting from the back of said cup; said friction elements being positioned in pairs back to back on opposite sides of said plate with said rivet heads each positioned in separate plate apertures; and a second rivet passing through aid central apertures in both friction elements and an aperture in said plate securing the friction elements to each other and clamping said plate between them.

2. A clutch element comprising a metal plate defining a plurality of apertures therein, said apertures being arranged in groups of three; a first rivet located in a first aperture of each of said groups and a friction element secured to each side of said metal plate by said rivet; said friction element including an annular disc of friction material, a shallow metal cup enclosing said disc on its back and periphery and a second rivet located in an opening in the back of said cup spaced from its central aperture, said rivet having one end upset and positioned entirely below the rubbing surface of the friction material and having its opposite end formed into a cylindrical head, the cylindrical head of the friction element on one side of the plate being positioned entirely in a second aperture of said group of three and the cylindrical head of the friction element on the opposite side of the plate being positioned entirely inside of the third aperture of said group of three.

References Cited in the file of this patent

UNITED STATES PATENTS

| | | |
|---|---|---|
| 2,657,772 | Chamberlain | Nov. 3, 1953 |
| 2,784,105 | Stedman et al. | Mar. 5, 1957 |
| 2,806,570 | Markus | Sept. 17, 1957 |
| 2,835,367 | Steck | May 20, 1958 |

FOREIGN PATENTS

| | | |
|---|---|---|
| 575,929 | Great Britain | Mar. 12, 1946 |
| 578,289 | Great Britain | June 21, 1946 |
| 711,405 | Great Britain | June 30, 1954 |